(12) United States Patent
Suzuki et al.

(10) Patent No.: US 12,297,643 B2
(45) Date of Patent: May 13, 2025

(54) REINFORCING MATERIAL AND REINFORCING STRUCTURE

(71) Applicant: NITTO DENKO CORPORATION, Osaka (JP)

(72) Inventors: Yuto Suzuki, Osaka (JP); Takayuki Iwase, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 23 days.

(21) Appl. No.: 17/788,643

(22) PCT Filed: Oct. 15, 2020

(86) PCT No.: PCT/JP2020/038961
§ 371 (c)(1),
(2) Date: Jun. 23, 2022

(87) PCT Pub. No.: WO2021/131259
PCT Pub. Date: Jul. 1, 2021

(65) Prior Publication Data
US 2023/0035852 A1   Feb. 2, 2023

(30) Foreign Application Priority Data
Dec. 27, 2019   (JP) ................. 2019-239145

(51) Int. Cl.
*E04C 5/07* (2006.01)
*C08J 7/04* (2020.01)

(52) U.S. Cl.
CPC ............ *E04C 5/07* (2013.01); *C08J 7/042* (2013.01); *C08J 2363/00* (2013.01)

(58) Field of Classification Search
CPC ........ B32B 2260/021; B32B 2260/046; B32B 2262/101; B32B 2307/748; B32B 25/16; B32B 27/12; B32B 27/18; B32B 27/38; B32B 5/02; C08J 2363/00; C08J 7/042; E04C 5/07
See application file for complete search history.

(56) References Cited

U.S. PATENT DOCUMENTS

| 8,017,533 B2 | 9/2011 | Kuriu et al. |
| 9,114,599 B2 | 8/2015 | Mase et al. |

(Continued)

FOREIGN PATENT DOCUMENTS

| CN | 1720272 A | 1/2006 |
| CN | 103079808 A | 5/2013 |

(Continued)

OTHER PUBLICATIONS

International Search Report issued in PCT/JP2020/038961 on Jan. 12, 2021.

(Continued)

*Primary Examiner* — Frances Tischler
(74) *Attorney, Agent, or Firm* — Edwards Neils LLC; Jean C. Edwards, Esq.

(57) ABSTRACT

A reinforcing material that includes a resin layer and a constraining layer disposed on the resin layer. The resin layer contains a thermosetting resin, a diene rubber, a tackifier resin, and a vulcanizing agent. The thermosetting resin contains a flexible epoxy resin. The tackifier resin has a softening temperature of 75° C. or more and 100° C. or less. The tackifier resin has a bromine value of 30 gBr$_2$/100 g or more.

9 Claims, 1 Drawing Sheet

(56) References Cited

U.S. PATENT DOCUMENTS

| | | |
|---|---|---|
| 2006/0063892 A1 | 3/2006 | Yamane |
| 2007/0110978 A1 | 5/2007 | Kawaguchi et al. |
| 2010/0048749 A1 | 2/2010 | Takata et al. |
| 2010/0256302 A1 | 10/2010 | Matsumoto et al. |
| 2011/0143125 A1 | 6/2011 | Fujii et al. |
| 2013/0071657 A1 | 3/2013 | Mase |
| 2013/0153142 A1 | 6/2013 | Kawaguchi |
| 2013/0216843 A1 | 8/2013 | Mase et al. |

FOREIGN PATENT DOCUMENTS

| | | |
|---|---|---|
| JP | H10-140125 A | 5/1998 |
| JP | 2005-041210 A | 2/2005 |
| JP | 3725894 B2 | 12/2005 |
| JP | 2007-160917 A | 6/2007 |
| JP | 2008-030257 A | 2/2008 |
| JP | 2009-039909 A | 2/2009 |
| JP | 2009-161659 A | 7/2009 |
| JP | 2010-275488 A | 12/2010 |
| JP | 2012-076279 A | 4/2012 |
| JP | 5489571 B2 | 5/2014 |
| JP | 5694009 B2 | 4/2015 |
| JP | 5946254 B2 | 7/2016 |

OTHER PUBLICATIONS

Written Opinion issued in PCT/JP2020/038961 on Jan. 12, 2021.
Office Action, issued by the China National Intellectual Property Administration on Dec. 29, 2023, in connection with Chinese Patent Application No. 202080090354.3.
Hong Zhongling et al., Deep Processing of Chemical Organic Raw Materials for Details, Jun. 30, 1997, p. 92, 1st Edition, Chemical Industry Press.
Extended European Search Report issued by the European Patent Office on Jan. 9, 2024, in connection with European Patent Application No. 20905285.1.
Office Action, issued by the China National Intellectual Property Administration on Jul. 5, 2024, in connection with Chinese Patent Application No. 202080090354.3.

REINFORCING MATERIAL AND REINFORCING STRUCTURE

CROSS-REFERENCE TO RELATED APPLICATIONS

The present application is a 35 U.S.C. 371 National Stage Entry of: PCT/JP2020/038961, filed on Oct. 15, 2020, which claims priority from Japanese Patent Application No. 2019-239145, filed on Dec. 27, 2019, the contents of all of which are herein incorporated by reference in their entirety.

TECHNICAL FIELD

The present invention relates to a reinforcing material and a reinforcing structure.

BACKGROUND ART

Reinforcing materials (reinforcing sheets), each of which includes a constraining layer and a reinforcement layer, have been known. The reinforcement layer at least contains a styrene-butadiene rubber, an epoxy resin, and a foaming agent (for example, see Patent document 1 below).

CITATION LIST

Patent Document

Patent Document 1: Japanese Unexamined Patent Publication No. 2005-41210

SUMMARY OF THE INVENTION

Problem to be Solved by the Invention

The reinforcing material described in Patent Document 1 is required to deliver further improved reinforcement performance.

The present invention aims to provide a reinforcing material and a reinforcing structure that allow for improving the reinforcement performance.

Means for Solving the Problem

The present invention [1] includes a reinforcing material comprising: a resin layer containing a thermosetting resin, a diene rubber, a tackifier resin, and a vulcanizing agent; and a constraining layer disposed on the resin layer, wherein the thermosetting resin contains a flexible epoxy resin, the tackifier resin has a softening temperature of 75° C. or more and 100° C. or less, and the tackifier resin has a bromine value of 30 gBr$_2$/100 g or more The present invention [2] includes the reinforcing material described in [1], wherein the tackifier resin is a aliphatic-aromatic copolymerized petroleum resin containing a structural unit derived from an aliphatic monomer and a structural unit derived from an aromatic monomer.

The present invention [3] includes the reinforcing material described in [2], wherein a ratio of the structural unit derived from an aliphatic monomer to a total of the structural unit derived from an aliphatic monomer and the structural unit derived from an aromatic monomer is more than 50% by mass.

The present invention [4] includes a reinforcing structure comprising: an object to be reinforced; and a reinforcement member that reinforces the object to be reinforced, wherein the reinforcement member includes a reinforcement layer made of a cured product of the resin layer described in [1], and disposed on the object to be reinforced, and a constraining layer that is the constraining layer described in [1], and disposed on the reinforcement layer.

Effects of the Invention

In the reinforcing material and reinforcing structure of the present invention, the resin layer contains the tackifier resin having a specific softening temperature and a specific bromine value.

Thus, the adhesive force of the resin layer can be ensured, and the strength of the reinforcing material, which is the cured resin layer, can be improved.

As a result, the reinforcement performance of the reinforcing material can be improved.

BRIEF DESCRIPTION OF THE DRAWINGS

FIG. 2A illustrates an adhering step of adhering the reinforcing material to the object to be reinforced. FIG. 2B illustrates a curing step of foaming and curing the reinforcing material adhered to the object to be reinforced.

DESCRIPTION OF THE EMBODIMENT

1. Reinforcing Material 1

Figure 1:
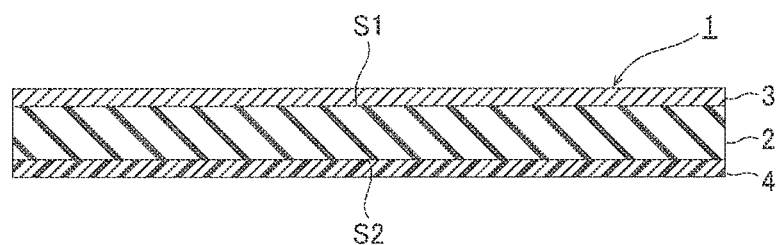
FIG. 1 is a cross-sectional view of a reinforcing material of one embodiment of the present invention.
Figure 2A:
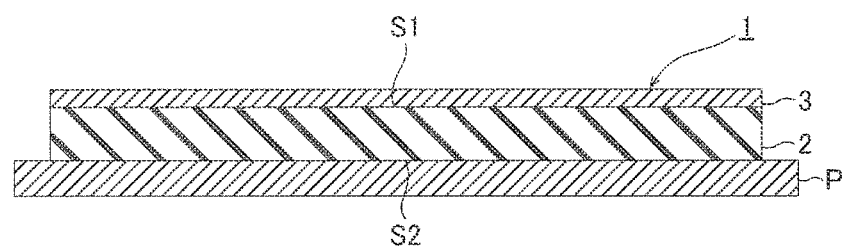
FIGS. 2A and 2B illustrate a reinforcement method of reinforcing an object to be reinforced with the reinforcing material illustrated in FIG. 1.
Figure 2B:
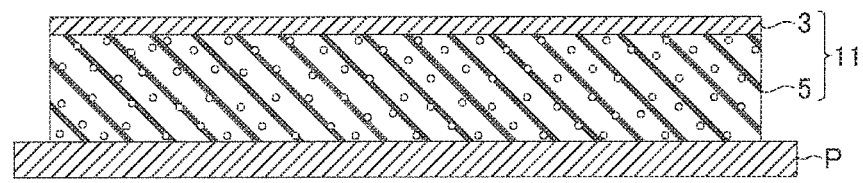

A reinforcing material 1 illustrated in FIG. 1 is a member for reinforcing an object to be reinforced P (see FIG. 2B). Examples of the object to be reinforced P include metallic panels such as an aluminum plate, a stainless-steel plate, an iron plate, a copper plate, a zinc plate, and a brass plate. The metallic panel is used for, for example, transports such as automobiles, railway vehicles, vessels, and airplanes, or buildings. Preferably, the reinforcing material 1 is a reinforcing sheet. The reinforcing material 1 includes a resin layer 2 and a constraining layer 3. The reinforcing material 1, as necessary, includes a release sheet 4.

(1) Resin Layer 2

The resin layer 2 has a predetermined thickness. The resin layer 2 has a first surface S1 and a second surface S2 in a thickness direction of the resin layer 2.

The resin layer 2 has a thickness of, for example, 0.1 mm or more, preferably 0.2 mm or more, and, for example, 10 mm or less, preferably 5 mm or less.

The resin layer 2 consists of a resin composition containing a thermosetting resin, a diene rubber, a tackifier resin, and a vulcanizing agent. The resin composition preferably contains a vulcanization accelerator, a thermosetting resin curing agent, and a foaming agent in addition to the above-described components. The resin composition may contain an additive such as a filler, a pigment, or a thixotropic agent in addition to the above-described components.

(1-1) Thermosetting Resin

The thermosetting resin contains a flexible epoxy resin. The flexible epoxy resin has higher flexibility than bisphenol A epoxy resins. Preferably, the flexible epoxy resin has higher flexibility than the aromatic epoxy resins described below. More preferably, the flexible epoxy resin has higher flexibility than the other epoxy resins described below.

The flexible epoxy resin does not include a ring structure (such as an aromatic ring, an aliphatic hydrocarbon ring, or a nitrogen-containing ring) in its main chain, or includes a smaller number of ring structures than the other epoxy resins described below do. Preferably, the flexible epoxy resin has a flexible component instead of a ring structure in its main chain. Examples of the flexible component include acyclic aliphatic hydrocarbon components, rubber components, and polyol components.

An epoxy equivalent of the flexible epoxy resin is, for example, 220 g/eq or more, preferably 300 g/eq or more, more preferably 500 g/eq or more. When the epoxy equivalent is the above-described lower limit or more, the flexibility of a reinforcement member 11 described below (see FIG. 2B) can be improved. The reinforcement member 11 includes a reinforcement layer 5 that is a cured product of the resin layer 2, and a constraining layer 3.

The epoxy equivalent of the flexible epoxy resin is, for example, 2000 g/eq or less, preferably 1200 g/eq or less. When the epoxy equivalent is the above-described upper limit or less, the strength of the reinforcement member 11 described below can be ensured.

Specifically, examples of the flexible epoxy resin include aliphatic modified epoxy resins, butadiene epoxy resins, ε-caprolactone-modified epoxy resins, thiol epoxy resins, rubber (such as NBR, carboxyl group-terminated NBR, or amino group-terminated NBR)-modified epoxy resins, dimer acid-modified epoxy resins, urethane-modified epoxy resins, polyol-modified epoxy resins, and amine-modified epoxy resins. As the flexible epoxy resin, preferably an aliphatic modified epoxy resin, a rubber-modified epoxy resin, or a dimer acid-modified epoxy resin, more preferably a dimer acid-modified epoxy resin is used for the mutual solubility with rubber and the adhesion of the resin layer 2. The flexible epoxy resins may be used in combination of two or more.

Examples of commercial products of the flexible epoxy resin include the jER (registered trademark) series including jER 871, jER 872, and jER 872X75 (manufactured by Mitsubishi Chemical Holdings Corporation).

The thermosetting resin may contain an epoxy resin other than the flexible epoxy resin. Examples of the epoxy resin other than the flexible epoxy resin include bisphenol epoxy resins (such as bisphenol A epoxy resin, bisphenol F epoxy resin, and bisphenol S epoxy resin), novolak epoxy resins (such as phenol novolak epoxy resin and cresol novolak epoxy resin), aromatic epoxy resins such as naphthalene epoxy resin and biphenyl epoxy resin, alicyclic epoxy resins such as dicyclo ring-type epoxy resin and hydrogenated bisphenol A epoxy resin, and nitrogen-containing cyclic epoxy resins such as triglycidyl isocyanurate, hydantoin epoxy resin, and triepoxypropyl isocyanurate resin.

For example, 30% by mass or more, preferably 35% by mass or more, and, for example, 50% by mass or less, preferably 40% by mass or less of the thermosetting resin is contained in the resin layer 2 (resin composition).

For example, 50 parts by mass or more, preferably 60 parts by mass or more, and, for example, 100 parts by mass or less of the flexible epoxy resin is contained in 100 parts by mass of the thermosetting resin.

(1-2) Diene Rubber

Examples of the diene rubber include styrene-butadiene rubber (SBR), acrylonitrile-butadiene rubber (NBR), isoprene rubber, and butadiene rubber. Preferably, NBR and polybutadiene rubber are used in combination.

To 100 parts by mass of the thermosetting resin, a blending ratio of the diene rubber is, for example, 10 parts by mass or more, preferably 20 parts by mass or more, more preferably 40 parts by mass or more, and, for example, 500 parts by mass or less, preferably 300 parts by mass or less, more preferably 100 parts by mass or less.

(1-3) Tackifier Resin

The tackifier resin gives adhesion to the resin layer 2.

The tackifier resin has a specific softening temperature and a specific bromine value. The bromine value is determined by the amount of the unsaturated bonds of the tackifier resin. Thus, "to have a specific bromine value" means to have a specific amount of unsaturated bonds.

The softening temperature of the tackifier resin is, for example, 75° C. or more, preferably 80° C. or more, more preferably 85° C. or more. When the softening temperature of the tackifier resin is the above-described lower limit or more, the strength of the reinforcement member 11 described below can be ensured.

The softening temperature of the tackifier resin is, for example, 100° C. or less, preferably 96° C. or less. When the softening temperature of the tackifier resin is the above-described upper limit or less, the adhesive force of the resin layer 2 to the object to be reinforced P can be ensured.

The softening temperature is measured by the method specified by JIS K 5601-2-2: 1999.

The strength of the reinforcement member 11 is evaluated using the breaking strength of the reinforcement member 11. The breaking strength of the reinforcement member 11 is measured by the method described below in Examples.

The breaking strength of the reinforcement member 11 is, for example, 250 N/cm or more, preferably 260 N/cm or more. When the breaking strength of the reinforcement layer 5 is the above-described lower limit or more, the object to be reinforced P can surely be reinforced. The upper limit of the breaking strength of the reinforcement member 11 is not limited.

The adhesive force of the resin layer 2 is evaluated using the adhesive force of the resin layer 2 at 5° C. The adhesive force of the resin layer 2 at 5° C. is measured by the method described below in Examples.

The adhesive force of the resin layer 2 at 5° C. is, for example, 5 N/10 mm or more, preferably 10 N/10 mm or more, more preferably 30 N/10 mm or more. When the adhesive force of the resin layer 2 at 5° C. is the above-described lower limit or more, a fall of the reinforcing material 1 adhered to the object to be reinforced P can be suppressed. The upper limit of the adhesive force of the resin layer 2 at 5° C. is not limited.

The bromine value of the tackifier resin is, for example, 30 $gBr_2/100$ g or more, preferably 35 $gBr_2/100$ g or more, more preferably 40 $gBr_2/100$ g or more. When the bromine value of the tackifier resin is the above-described lower limit or more, the strength of the reinforcement member 11 described below can be improved.

The upper limit of the bromine value of the tackifier resin is not limited. The bromine value of the tackifier resin is, for example, 100 $gBr_2/100$ g or less.

The bromine value is measured by the method described below in Examples.

A weight-average molecular weight of the tackifier resin is, for example, 1000 or more, preferably 2000 or more, more preferably 3000 or more. When the weight-average molecular weight of the tackifier resin is the above-described lower limit or more, the strength of the reinforcement member 11 described below can be ensured.

The weight-average molecular weight of the tackifier resin is, for example, 5000 or less, preferably 4000 or less. When the weight-average molecular weight of the tackifier resin is the above-described upper limit or less, the tackifier resin facilitates the mutual solubilization of the diene rubber and the thermosetting resin. Thus, the adhesive force of the resin layer 2 to the object to be reinforced P can be ensured.

The weight-average molecular weight is calibrated with standard polystyrene based on gel permeation chromatography (GPC).

Examples of the tackifier resin include natural resin-based tackifier resins and synthetic resin-based tackifier resins.

Examples of the natural resin-based tackifier resin include rosin resins such as rosin ester, and terpene resins such as aromatic modified terpene resin and terpene phenol resin.

Examples of the synthetic resin-based tackifier resin include aliphatic (C5) petroleum resins, aromatic (C9) petroleum resins, and aliphatic-aromatic copolymerized (C5/C9) petroleum resins.

The aliphatic (C5) petroleum resin mainly contains a structural unit derived from an aliphatic monomer having five carbon atoms, such as isoprene or piperylene. The aliphatic (C5) petroleum resin is produced by the polymerization of a mixture (C5 fraction) of aliphatic hydrocarbon (such as isoprene or piperylene) having five carbon atoms obtained as a by-product of the thermal decomposition of naphtha.

The aromatic (C9) petroleum resin mainly contains a structural unit derived from an aromatic monomer having nine carbon atoms, such as styrene, vinyl toluene, or indene. The aromatic (C9) petroleum resin is produced by the polymerization of a mixture (C9 fraction) of aromatic hydrocarbon (such as styrene, vinyl toluene, or indene) having nine carbon atoms obtained as a by-product of the thermal decomposition of naphtha.

The aliphatic-aromatic copolymerized (C5/C9) petroleum resin mainly contains the above-described structural unit derived from an aliphatic monomer and the above-described structural unit derived from an aromatic monomer. The aliphatic-aromatic copolymerized (C5/C9) petroleum resin is produced by the polymerization of the C5 fraction and the C9 fraction.

The tackifier resin is preferably a synthetic resin-based tackifier resin, more preferably an aliphatic-aromatic copolymerized petroleum resin.

When the tackifier resin is an aliphatic-aromatic copolymerized petroleum resin, the ratio (C5 ratio) of the structural unit derived from an aliphatic monomer to the total of the structural unit derived from an aliphatic monomer and the structural unit derived from an aromatic monomer is, for example, more than 50% by mass, preferably 60% by mass or more, and, for example, 80% by mass or less, preferably 70% by mass or less.

When the C5 ratio is more than the above-described lower limit, the adhesive force of the resin layer 2 to the object to be reinforced P can be ensured. When the C5 ratio is the above-described upper limit or less, the strength of the reinforcement member 11 described below can be ensured.

The C5 ratio can be measured by a nuclear magnetic resonance spectroscopy ($^1$H-NMR).

To 100 parts by mass of the thermosetting resin, a blending ratio of the tackifier resin is, for example, 20 parts by mass or more, preferably 40 parts by mass or more, and, for example, 70 parts by mass or less, preferably 60 parts by mass or less.

To 100 parts by mass of the diene rubber, a blending ratio of the tackifier resin is, for example, 50 parts by mass or more, preferably 80 parts by mass or more, and, for example, 200 parts by mass or less, preferably 150 parts by mass or less.

(1-4) Vulcanizing Agent

The vulcanizing agent forms crosslinks of the diene rubber (or vulcanizes the diene rubber) by heating.

Examples of the vulcanizing agent include sulfur, sulfur compounds, and organic peroxide. Sulfur is preferable as the vulcanizing agent.

To 100 parts by mass of the thermosetting resin, a blending ratio of the vulcanizing agent is, for example, 1 part by mass or more, preferably 5 parts by mass or more, more preferably 10 parts by mass or more, and, for example, 20 parts by mass or less, preferably 15 parts by mass or less.

To 100 parts by mass of the diene rubber, a blending ratio of the vulcanizing agent is, for example, 2 parts by mass or more, preferably 10 parts by mass or more, more preferably 20 parts by mass or more, and, for example, 80 parts by mass or less, preferably 70 parts by mass or less, more preferably 50 parts by mass or less.

To 100 parts by mass of the total of the diene rubber and the tackifier resin, a blending ratio of the vulcanizing agent is, for example, 1 part by mass or more, preferably 5 parts by mass or more, more preferably 10 parts by mass or more.

When the blending ratio of the vulcanizing agent is the above-described lower limit or more, crosslinks of the double bonds of the tackifier can be formed by using the vulcanization of the diene rubber, and thus the strength of the reinforcement member 11 can be improved.

To 100 parts by mass of the total of the diene rubber and the tackifier resin, the blending ratio of the above-described vulcanizing agent is, for example, 40 parts by mass or less, preferably 30 parts by mass or less.

When the blending ratio of the vulcanizing agent is the above-described upper limit or less, a small amount of the vulcanizing agent can improve the strength of the reinforcement member 11.

(1-5) Vulcanization Accelerator

The vulcanization accelerator promotes the vulcanization by the vulcanizing agent.

Examples of the vulcanization accelerator include thiazole vulcanization accelerators, thiourea vulcanization accelerators, thiuram vulcanization accelerators, dithiocarbamate vulcanization accelerators, guanidine vulcanization accelerators, aldehyde-ammonia vulcanization accelerators, and sulfenamide vulcanization accelerators. As the vulcanization accelerator, a thiazole vulcanization accelerator is preferable.

To 100 parts by mass of the thermosetting resin, a blending ratio of the vulcanization accelerator is, for example, 1 part by mass or more, preferably 3 parts by mass or more, more preferably 5 parts by mass or more, and, for example, 10 parts by mass or less, preferably 8 parts by mass or less.

To 100 parts by mass of the vulcanizing agent, a blending ratio of the vulcanization accelerator is, for example, 10 parts by mass or more, preferably 30 parts by mass or more, and, for example, 100 parts by mass or less, preferably 70 parts by mass or less.

(1-6) Thermosetting Resin Curing Agent

The thermosetting resin curing agent promotes the curing of the thermosetting resin.

Examples of the thermosetting resin curing agent include cyanamide, amine, acid anhydride, amide, hydrazide, imidazole, and imidazoline.

Examples of the cyanamide include dicyandiamide.

Examples of the amine include ethylenediamine, propylenediamine, diethylenetriamine, triethylenetetramine, and amine adduct thereof, methaphenylenediamine, diaminodiphenyl methane, and diaminodiphenyl sulfone.

Examples of the acid anhydride include phthalic anhydride, maleic anhydride, tetrahydrophthalic anhydride, hexahydrophthalic anhydride, methyl nadic anhydride, pyromellitic dianhydride, dodecenyl succinic anhydride, dichloro succinic anhydride, benzophenone tetracarboxylic anhydride, and chlorendic anhydride.

Examples of the amide include polyamide.

Examples of the hydrazide include dihydrazide.

Examples of the imidazole include methylimidazole, 2-ethyl-4-methylimidazole, ethylimidazole, isopropylimidazole, 2,4-dimethylimidazole, phenylimidazole, undecylimidazole, heptadecylimidazole, and 2-phenyl-4-methylimidazole.

Examples of the imidazoline include methylimidazoline, 2-ethyl-4-methylimidazoline, ethylimidazoline, isopropylimidazoline, 2,4-dimethylimidazoline, phenylimidazoline, undecylimidazoline, heptadecylimidazoline, and 2-phenyl-4-methylimidazoline.

To 100 parts by mass of the thermosetting resin, a blending ratio of the thermosetting resin curing agent is, for example, 1 part by mass or more, preferably 2 parts by mass or more, and, for example, 10 parts by mass or less, preferably 5 parts by mass or less.

(1-7) Foaming Agent

The foaming agent foams by heating. The resin layer 2 containing the foaming agent can increase the thickness of the reinforcement layer 5 described below and improve the strength of the reinforcement member 11.

Examples of the foaming agent include inorganic foaming agents and organic foaming agents.

Examples of the inorganic foaming agent include ammonium carbonate, ammonium hydrogen carbonate, sodium hydrogen carbonate, ammonium nitrite, sodium borohydride, and azides.

Examples of the organic foaming agent include N-nitroso compounds such as N,N'-dinitrosopentamethylenetetramine, azo compounds such as azobisisobutyronitrile, alkane fluorides such as trichloromonofluoromethane, hydrazine compounds such as 4,4'-oxybis (benzene sulfonyl hydrazide) and allylbis (sulfonyl hydrazide), semicarbazide compounds such as p-toluylenesulfonyl semicarbazide, and triazole compounds such as 5-morpholinyl-1, 2, 3, 4-thiatriazole. 4,4'-oxybis (benzene sulfonyl hydrazide) (OBSH) is preferable.

To 100 parts by mass of the thermosetting resin, a blending ratio of the foaming agent is, for example, 0.1 parts by mass or more, preferably 0.5 parts by mass or more, and, for example, 20 parts by mass or less, preferably 5 parts by mass or less.

To 100 parts by mass of the total of the thermosetting resin, the diene rubber, and the tackifier resin, a blending ratio of the foaming agent is, for example, 0.2 parts by mass or more, preferably 1 part by mass or more, and, for example, 40 parts by mass or less, preferably 10 parts by mass or less.

(2) Constraining Layer 3

The constraining layer 3 is disposed on the first surface S1 of the resin layer 2. The constraining layer 3 constrains the reinforcement layer 5 described below. The constraint of the constraining layer 3 on the reinforcement layer 5 improves the toughness of the reinforcement layer 5. The constraining layer 3 has a predetermined thickness in the thickness direction of the resin layer 2.

The constraining layer 3 has a thickness of, for example, 0.01 mm or more, preferably 0.05 mm or more, and, for example, 3 mm or less, preferably 1 mm or less.

Examples of the material of the constraining layer 3 include metals and glass fibers. Examples of the metals include aluminum and copper. As the metal, aluminum is preferable. As the glass fiber, a resin-impregnated fiberglass cloth is preferable.

(3) Release Sheet 4

The release sheet 4 is disposed on the second surface S2 of the resin layer 2. The release sheet 4 protects the resin layer 2 while being disposed on the second surface S2 of the resin layer 2. The release sheet 4 can be released from the resin layer 2. As the release sheet 4, for example, a known release paper can be used.

2. Reinforcement Method

Next, a method of reinforcing the object to be reinforced P by the reinforcing material 1 is described.

As illustrated in FIG. 2A and FIG. 2B, the reinforcing method includes an adhering step of adhering the reinforcing material 1 to the object to be reinforced P (see FIG. 2A), and a curing step of curing the resin layer 2 by heating in a state in which the reinforcing material 1 is adhered to the object to be reinforced P (see FIG. 2B).

As illustrated in FIG. 2A, in the adhering step, an operator releases the release sheet 4 from the resin layer 2 to bring the second surface S2 of the resin layer 2 into contact with the object to be reinforced P. The reinforcing material 1 is adhered to the object to be reinforced P by the adhesive force of the resin layer 2.

Next, in the curing step, the operator heats the object to be reinforced P to which the reinforcing material 1 is adhered.

The object to be reinforced P is heated at a heating temperature of, for example, 140° C. or more, preferably 160° C. or more, and, for example, 220° C. or less, preferably 200° C. or less.

The object to be reinforced P is heated for a heating time of, for example, 5 minutes or more, preferably 10 minutes or more, and, for example, 60 minutes or less, preferably 30 minutes or less.

As illustrated in FIG. 2A and FIG. 2B, the resin layer 2 is cured in the curing step. When the resin layer 2 contains the foaming agent, the resin layer 2 is foamed and cured. The resin layer 2 is cured, thereby forming the reinforcement layer 5. The reinforcement layer 5 is made of a cured product of the resin layer 2. The reinforcement layer 5 is fixed to the object to be reinforced P.

When the resin layer 2 contains the foaming agent, an expansion ratio (the thickness of the reinforcement layer 5/the thickness of the resin layer 2) is, for example, twice or more, preferably, 3 times or more, and, for example, 10 times or less.

By completing the curing step, the reinforcing structure 10 including the object to be reinforced P and the reinforcement member 11 is formed as illustrated in FIG. 2B. The reinforcement member 11 includes the reinforcement layer 5 and the constraining layer 3. The reinforcement member 11 reinforces the object to be reinforced P. The reinforcement layer 5 is disposed on the object to be reinforced P. The constraining layer 3 is disposed on the reinforcement layer 5. The constraining layer 3 is disposed on the opposite side to the object to be reinforced P with respect to the reinforcement layer 5 from in the thickness direction of the reinforcement layer 5.

3. Operations and Effects

In the reinforcing material 1, the resin layer 2 illustrated in FIG. 1 contains the tackifier resin having a specific softening temperature and a specific bromine value.

Thus, the adhesive force of the resin layer 2 can be ensured, and the strength of the reinforcement member 11 (the reinforcing material 1 including the cured resin layer 2, see FIG. 2B) can be improved. This is presumably because a crosslink structure is formed by the reaction of the unsaturated bonds in the tackifier resin in the curing step.

As a result, the reinforcement performance of the reinforcing material 1 can be improved.

Example

Next, the present invention is described with reference to Examples and Comparative Examples. The present invention is not limited to the following Examples. The specific numeral values used in the description below, such as physical property values and parameters, can be replaced with the corresponding physical property values and parameters in the above-described "DESCRIPTION OF THE EMBODIMENT", including the upper limit values (numeral values defined with "or less", and "less than") or the lower limit values (numeral values defined with "or more", and "more than").

1. Production of Resin Layer

Example 1

The materials (1) to (8) described below were mixed, thereby preparing a resin composition.

The prepared resin composition was extended to a thickness of 1.0 mm by application of pressure by a mold press machine, thereby producing a resin layer. A resin-impregnated glass cloth with a thickness of 0.2 mm was adhered as a constraining layer to a one-side surface of the produced resin layer. A sheet of release paper was adhered to the other-side surface (opposite to the one-side surface) of the resin layer. In this manner, a reinforcing material was produced.

Table 1 shows the softening temperature, bromine value, weight-average molecular weight, C5 ratio of the tackifier resin.

The bromine value was measured by the following method. First, 10 ml of hexane was added to a predetermined amount of the tackifier resin, thereby preparing a hexane solution of the tackifier resin. Next, a predetermined excess of a potassium bromide-potassium bromate mixture was added to the solution under an acid condition of acetic acid. In this manner, bromine was added to the tackifier resin. Next, a potassium iodide solution was added thereto. Next, free iodine was titrated with sodium thiosulfate to calculate the mass of the added bromine (bromine value) per 100 g of the tackifier resin.

(1) Thermosetting Resin

Flexible epoxy resin (dimer acid-modified epoxy resin, an epoxy equivalent of 600 to 700 g/eq, manufactured by Mitsubishi Chemical Holdings Corporation, "jER 872") 70 parts by mass Hydrogenated bisphenol A type epoxy resin (an epoxy equivalent of 215 g/eq, manufactured by ADEKA CORPORATION, "EP-4080E") 30 parts by mass (2) Diene Rubber Polybutadiene diene rubber (manufactured by Asahi Kasei Chemicals, "TUFDENE 2003") 40 parts by mass Acrylonitrile-butadiene diene rubber (manufactured by ZEON CORPORATION, "Nipol 1052J") 10 parts by mass (3) Tackifier Resin Aliphatic-aromatic copolymerized petroleum resin (manufactured by Tosoh Corporation, "Petrotack 90HM") 50 parts by mass "Petrotack 90HM" is abbreviated to "90HM" in Table 1.

(4) Vulcanizing Agent 12 parts by mass of sulfur (manufactured by Tsurumi Chemical Industry Co., ltd., "GOLDEN FLOWER SULFUR POWDER")

(5) Vulcanization Accelerator 6 parts by mass of thiazole vulcanization accelerator (manufactured by OUCHI SHINKO CHEMICAL INDUSTRIAL CO., LTD., "NOCCELER DM")

(6) Thermosetting Resin Curing Agent

Dicyandiamide (manufactured by NIPPON CARBIDE INDUSTRIES CO., INC.) 3 parts by mass (7) Foaming Agent 4,4'-oxybis (benzene sulfonyl hydrazide) (OBSH) 2.5 parts by mass (manufactured by EIWA CHEMICAL IND. CO., LTD., "Neocellborn N #1000S")

(8) Filler

Heavy calcium carbonate 50 parts by mass (manufactured by Maruo Calcium Co., Ltd.) Examples 2 and 3 and Comparative Examples 1 to 3

A reinforcing material was produced in the same manner as Example 1 except that the tackifier resin was changed to the tackifier resin shown in Table 1.

In Table 1, "100V" is short for Petrotack 100V (aliphatic-aromatic copolymerized petroleum resin, manufactured by Tosoh Corporation), "90" is short for Petrotack 90 (aliphatic-aromatic copolymerized petroleum resin, manufactured by Tosoh Corporation), "60" is short for Petrotack 60 (aliphatic-aromatic copolymerized petroleum resin, manufactured by Tosoh Corporation), "T1080" is short for HIKOREZ T-1080 (aliphatic-aromatic copolymerized petroleum resin, manufactured by Kolon Industries Inc.), and "G115" is short for Quintone G115 (aliphatic-aromatic copolymerized petroleum resin, manufactured by ZEON CORPORATION).

2. Measurement of Adhesive Force of Resin Layer

A belt-shaped test piece was cut out of the reinforcing material of each of Examples and Comparative Examples. The test piece had a width (a length in a direction orthogonal to a longitudinal direction of the test piece) of 25 mm. The release paper was peeled from the test piece. Thereafter, the test piece was adhered to a steel plate by pressing with a 2 kg roller in a 5° C. atmosphere. Thirty minutes after the pressure adhesion of the test piece to the steel plate, a 90° peel test (at a tensile speed of 300 mm/min) was carried out using a tensile and compression testing machine Technograph TG-5KN (manufactured by MinebeaMitsumi Inc.) in a 5° C. atmosphere to measure the adhesive force (N/25 mm). The results are shown in Table 1.

3. Measurement of Breaking Strength of Reinforcement Member

The release paper was peeled from the reinforcing material of each of Examples and Comparative Examples. Thereafter, the reinforcing material was adhered to the whole surface of a cold-rolled steel plate that was the object to be reinforced (manufactured by Nippon Testpanel Co., Ltd., SPCC-SD, width: 25 mm, length: 150 mm, thickness: 0.8 mm) in a 20° C. atmosphere.

Next, the steel plate to which the reinforcing material was adhered was heated at 180° C. for 20 minutes. In this manner, the resin layer was foamed and cured, and then a test piece including the steel plate and the reinforcement member (including the reinforcement layer that is a cured product of the resin layer, and the constraining layer) was produced.

Thereafter, the breaking strength of the reinforcement member was measured using a tensile and compression testing machine Technograph TG-5KN (manufactured by MinebeaMitsumi Inc.). In detail, the testing machine supported the test piece at an interval of 100 mm in a state in which the steel plate was on top. Then, the test bar was dropped from above to the longitudinal center of the test piece at a speed of 1 mm/min.

The bending strength (N) when the reinforcement member was broken after the contact of the test bar with the steel plate was measured as the breaking strength. The results are shown in Table 1.

TABLE 1

|  | Example 1 | Example 2 | Example 3 | Comparative Example 1 | Comparative Example 2 | Comparative Example 3 |
|---|---|---|---|---|---|---|
| Tackifier resin | 90 HM | 100V | 90 | T1080 | 60 | G115 |
| Softening temperature (° C.) | 87 | 96 | 95 | 87 | 72 | 115 |
| Bromine value (Br$_2$/100 g) | 49 | 43 | 31 | 27 | 43 | 37 |
| Weight-average molecular weight | 3500 | 3800 | 1600 | 2000 | 3200 | 3000 |
| 5 C. ratio (% by mass) | 70 | 60 | 30 | 80 | 70 | 75 |
| Breaking strength (N/cm) | 268.9 | 287.1 | 300.0 | 249.3 | 214.6 | 273.6 |
| Adhesive force at 5° C. (N/10 mm) | 48.4 | 32.4 | 8.0 | 45.1 | 80.5 | 3.6 |

While the illustrative embodiments of the present invention are provided in the above description, such is for illustrative purpose only and it is not to be construed as limiting in any manner Modification and variation of the present invention that will be obvious to those skilled in the art is to be covered by the following claims.

INDUSTRIAL APPLICABILITY

The reinforcing material and reinforcing structure of the present invention are used for reinforcing the metal panels used for, for example, transports such as automobiles, railway vehicles, vessels, and airplanes, or buildings.

DESCRIPTION OF REFERENCE NUMERALS 1 reinforcing material
2 resin layer
3 constraining layer
5 reinforcement layer
10 reinforcing structure
11 reinforcement member
P object to be reinforced

The invention claimed is:

1. A reinforcing material comprising:
a resin layer containing a thermosetting resin, a diene rubber, a tackifier resin, and a vulcanizing agent; and
a constraining layer disposed on the resin layer, wherein
a ratio of the diene rubber is less than 100 parts by mass with respect to 100 parts by mass of the thermosetting resin,
the thermosetting resin contains a first epoxy resin having an epoxy equivalent of more than 500 g/eq and a second epoxy resin other than the first epoxy resin,
60 parts by mass or more of the first epoxy resin is contained in 100 parts by mass of the thermosetting resin,
the tackifier resin has a softening temperature of 75° C. or more and 100° C. or less,
the tackifier resin has a bromine value of 30 gBr$_2$/100 g or more, and
wherein a main chain of the first epoxy resin comprises acyclic aliphatic hydrocarbon components, and has a smaller number of ring structures than a main chain of the second epoxy resin.

2. The reinforcing material according to claim 1, wherein the tackifier resin is a aliphatic-aromatic copolymerized petroleum resin containing a structural unit derived from an aliphatic monomer and a structural unit derived from an aromatic monomer.

3. The reinforcing material according to claim 2, wherein a ratio of the structural unit derived from an aliphatic monomer to a total of the structural unit derived from an aliphatic monomer and the structural unit derived from an aromatic monomer is more than 50% by mass.

4. A reinforcing structure comprising:
an object to be reinforced; and
a reinforcement member that reinforces the object to be reinforced, wherein the reinforcement member includes:
a reinforcement layer made of a cured product of the resin layer according to claim 1, and disposed on the object to be reinforced, and
a constraining layer that is the constraining layer according to claim 1, and disposed on the reinforcement layer.

5. The reinforcing material according to claim 1, wherein a ratio of the tackifier resin is 40 parts by mass or more and 60 parts by mass or less with respect to 100 parts by mass of the thermosetting resin.

6. The reinforcing material according to claim 1, wherein the first epoxy resin is a dimer acid-modified epoxy resin, and the second epoxy resin is a hydrogenated bisphenol A epoxy resin.

7. The reinforcing material according to claim 1, wherein the main chain of the first epoxy resin does not include a ring structure.

8. The reinforcing material according to claim 1, wherein the first epoxy resin comprises:
an aliphatic modified epoxy resin,
a butadiene epoxy resin,
an ε-caprolactone-modified epoxy resin,
a thiol epoxy resin,
a rubber-modified epoxy resin, a dimer acid-modified epoxy resin,
an urethane-modified epoxy resin,
a polyol-modified epoxy resin,
an amine-modified epoxy resin, or
a combination thereof.

9. The reinforcing material according to claim 1, wherein the second epoxy resin comprises:
a bisphenol epoxy resin,
a novolak epoxy resin,
an aromatic epoxy resin,
an alicyclic epoxy resin,
a nitrogen-containing cyclic epoxy resin, or
a combination thereof.

* * * * *